T. F. NICHOLS.
SOLAR STEAM GENERATOR.
APPLICATION FILED DEC. 27, 1911.
1,047,554.
Patented Dec. 17, 1912.
2 SHEETS—SHEET 1.
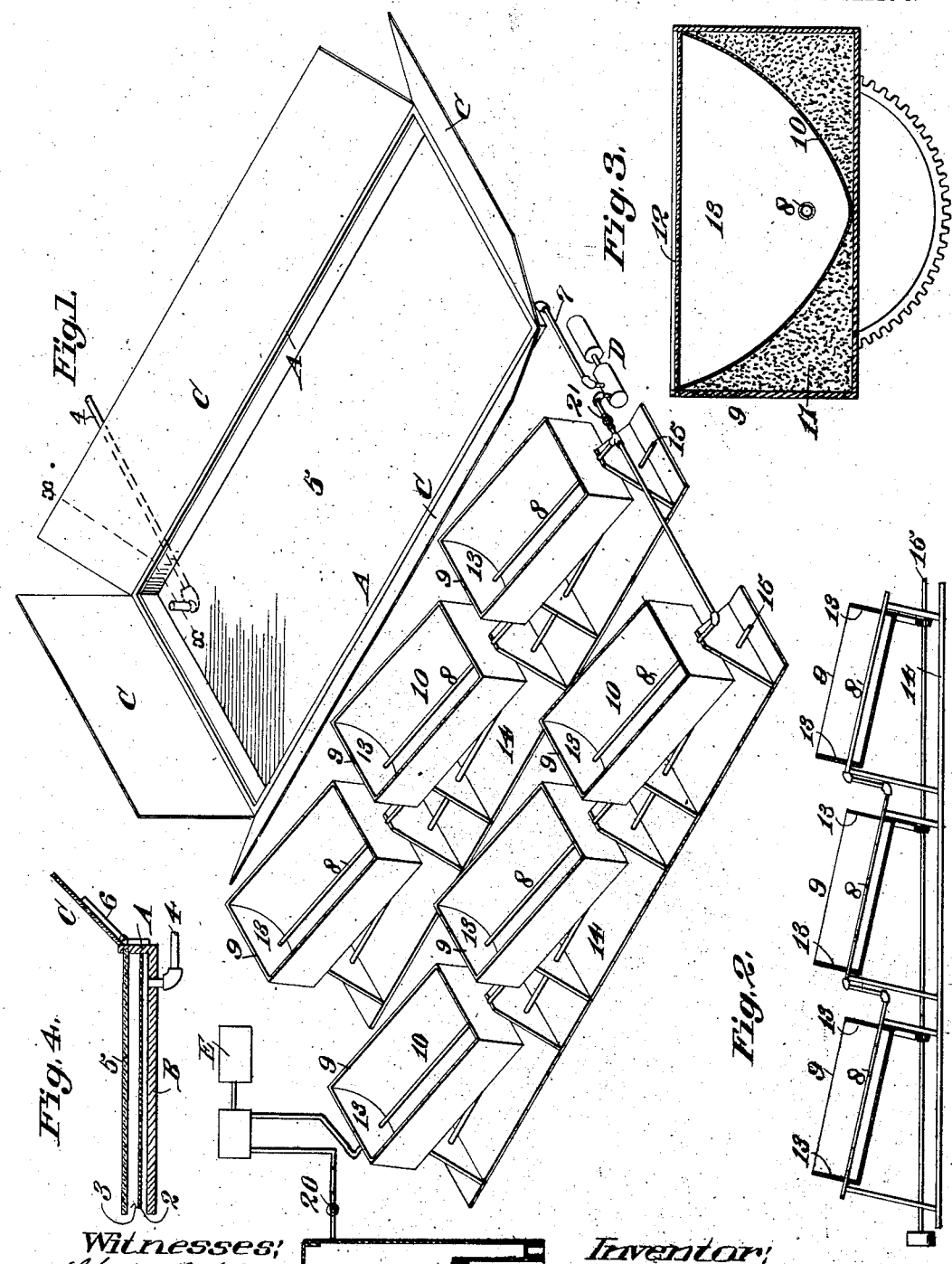
Witnesses:
Charles Pickles
R. H. Burr
Inventor:
Thomas F. Nichols
By G. H. Strong, atty

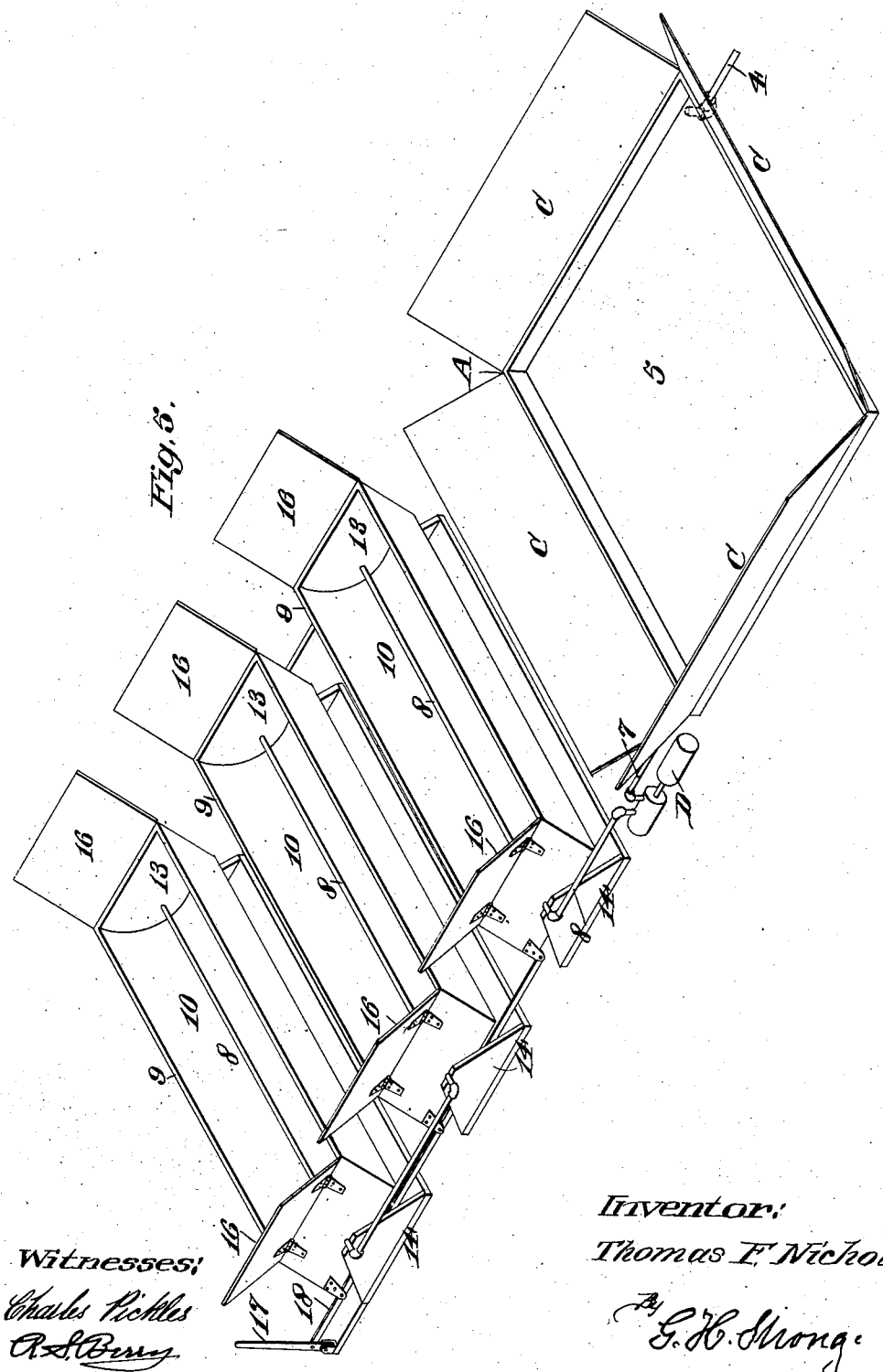

UNITED STATES PATENT OFFICE.

THOMAS F. NICHOLS, OF RAY, ARIZONA.

SOLAR STEAM-GENERATOR.

1,047,554.           Specification of Letters Patent.      Patented Dec. 17, 1912.

Application filed December 27, 1911. Serial No. 668,017.

*To all whom it may concern:*

Be it known that I, THOMAS F. NICHOLS, a citizen of the United States, residing at Ray, in the county of Pinal and State of Arizona, have invented new and useful Improvements in Solar Steam-Generators, of which the following is a specification.

This invention relates to a system of utilizing the sun's heat, and particularly pertains to improvements in an apparatus for raising the temperature of water or other liquids in a series of steps so as to generate or to aid in the generation of steam for power purposes.

It is the object of this invention to provide an apparatus of the above character, which is simple in construction and operation and which can be installed at small cost.

A further object is to provide a solar heater which is especially adapted for use in hot, arid countries as a means for generating steam for operating various machinery, and which is particularly adapted to be used with any form of steam boiler to assist in the generation of steam, and, when sufficiently hot, to permit of the boiler fires being extinguished altogether, thus economizing fuel costs.

A further object is to provide a solar heater having a high degree of efficiency and good thermal insulation and which is capable of adjustment so as to continuously be in a position to absorb the sun's heat as the latter changes its position during its travel through the heavens.

A further object of this invention is to provide a solar heater of the above character in the form of a series of units conveniently joined so that the number of units may be increased or diminished according to the nature of the locality in which it is installed, the temperature to which it is desired to raise the water, and the volume of steam required.

Other objects will appear in the following specification.

The invention consists of the parts and the construction and combination of parts as hereinafter more fully described and claimed, having reference to the accompanying drawings, in which—

Figure 1 is a perspective view of the invention. Fig. 2 is a longitudinal section of same. Fig. 3 is a detail cross section of one of the heating units. Fig. 4 is a detail section on the line X—X of Fig. 1. Fig. 5 is a perspective view of a modified form of the invention.

In the drawings, A represents the outer walls of a preliminary heating tank, which is here shown as having a wooden bottom B, above which is disposed a thin metal plate 2 spaced a short distance from the bottom B to form a shallow water-tight space 3 therebeneath, which space is connected to a water supply pipe 4 through which water is delivered to the space 3 in any desired manner and from any available source.

The upper surface of the tank A is tightly sealed with a plate of glass 5 which is disposed some distance from the metallic plate 2 so as to form a dead air space within the tank A between the metallic plate 2 and the glass plate 5. This dead air space above the water in the space 3 is designed to prevent the radiation of heat from the water so that the heat received from the sun will cause the temperature of the water in the space 3 to rise.

Hinged on the sides of the tank A are metallic or other mirrors C, designed to be swung in such position in relation to the sun's rays as to reflect them and direct them upon the glass plate 5 to increase the number of rays impinging on the tank. The mirrors C are held in position by friction hinges 6, and are adjusted at various angles in relation to the plate 5 by hand. The position of the mirrors on the north and south sides of the tank is changed slightly at suitable intervals during a week or other period of time to provide for the change in declination of the sun. The positions of the mirrors on the east and west sides of the tank are changed every few hours in any suitable manner to provide for the changed position of the sun in its daily course across the heavens; the mirrors being so disposed in relation to the sun and the plate 5 that as many of the sun's rays as practicable shall be thrown upon the plate.

Leading from the space 3 in the tank A is a pipe 7 which leads to the feed opening of a force pump D, the discharge opening of which connects with a generating pipe 8. This generating pipe 8 passes longitudinally through a system of casings 9 on the lower interior surface at which is a parabolic mirror 10; the pipe 8 being disposed at the focus of the mirrors in the several casings.

The mirrors 10 are inclosed in the casing 9; sawdust or other thermal insulating material 11 being placed below the mirrors while the open sides of the mirrors facing the sun are covered by a glass plate 12, the ends of the casings 9 being formed of mirrors 13. The casings 9 are designed so that they can revolve about the generating pipes 8; the generating pipes 8 being rigidly supported in a frame 14. The casings 9 are designed to revolve on the pipe as on an axis so that the sun lies continuously in the plane passing through the pipe and the axis of all the parabolic sections of the mirrors. The rocking or revolving of the casings 9 may be accomplished in any desired manner; two mechanisms and arrangements being shown in the drawings.

In Fig. 1 the generating pipes 8 extend in a northerly and southerly direction. The portions of the generating pipes 8 on which the revolving casings 9 are supported are inclined so as to be substantially parallel to the axis of the earth. The generating pipe 8 passing out from the upper end of each casing 9 is bent down so that in passing up through the next unit it shall be at substantially the same elevation and inclination as in passing through the previous one. Each casing 9 is here shown as being furnished with a toothed segment at one end with which is meshed a spur gear on a driving shaft 15 which is rotated from a suitable source of power so that the sun will always lie in the axial plane of the mirrors as they rotate from east to west each day. No longitudinal adjustment of the casings 9 is necessary with the arrangement on account of the change in the sun's position in the north and south direction, as the pipe 8 will lie in the focus of the rays regardless of this change, and the mirrors 13 on the ends of the boxes will deflect such rays as strike them on the pipe 8.

In Fig. 5 the generating pipe 8 extends in an easterly and westerly direction and is level throughout the length of the mirrors 10. The casings 9 containing the mirrors are revolved on the generating pipe 8 as on an axis only so as to provide for the change in the sun's position in a northerly and southerly direction.

As the sun moves across the sky daily from east to west, mirrors 16 hinged on the upper edge of the ends of the casing are changed in position occasionally by hand or other suitable mechanism. To provide for the slow and small change of the sun's position in a northerly and southerly direction, a hand lever 17 may be employed; the lever 17 operating a rod 18 connected to the casings 9 in such manner as to rock the casings on their hinged mountings.

From the system of mirrors 10 the generating pipe 8 passes to any selected form of boiler 19, being furnished with a check valve 20 to prevent back pressure from the boiler. A force pump E may also be located between the mirrors 10 and the boiler. A check valve 21 is provided between the shallow tank A and the mirrors 10 in the pipe 8. The water supply may be so disposed that there will be a gravity pressure to force the water through the tank A and the check valve 21 into the generating pipes 8, in which case the force pump D may be dispensed with.

In the operation of this invention, water is delivered to the space 3 in the tank A beneath the plate 2 through the supply pipe 4 in any suitable manner where its temperature is raised by the action of the sun's rays directed on the plate 2 through the transparent plate 5; the mirrors C intensifying the heating action of the sun by increasing the number of rays directed against the plate 2. The water being previously heated in the tank A is delivered to the generating pipes 8 where it is acted on by sun's rays focused on the pipes 8 by the parabolic mirrors 10 in such manner as to convert it into steam which is delivered to the boiler 19 through the check valve 20, from whence it may be drawn off and used as required.

It is manifest that the solar heater will generate steam only during certain hours of the day, at which times the fires under the boiler 19 may be reduced or extinguished; the solar heater acting at other times to heat the water before it is delivered to the boiler 19.

By providing a series of separated heating units, as shown, I am enabled to install a solar heating plant of any desired capacity subject to reduction or enlargement as required.

Having thus described my invention, what I claim and desire to secure by Letters Patent is—

1. In a solar steam generator, the combination of a parabolic mirror, a casing in which said mirror is mounted, insulation disposed between the mirror and the casing, a transparent plate covering the parabolic mirror, mirrors disposed at and forming the ends of the parabolic mirror, a water conduit extending between the transparent plate and the parabolic mirror on the focal line of said mirror, said conduit forming an axial support for the casing which is revoluble thereon, and means for rocking the casing from side to side on the conduit.

2. In a solar steam generator, the combination of a parabolic mirror, a casing in which said mirror is mounted, insulation disposed between the mirror and the casing, a transparent plate covering the parabolic mirror, mirrors disposed at the ends of the parabolic mirror, a water conduit extending between the transparent plate and the parabolic mirror on the focal line of said mirror, said conduit forming a support for the casing which is revoluble thereon, means for rocking the casing from side to side on the conduit, means for superheating the water delivered to the conduit by the sun's rays, and a steam boiler to which the contents of the conduit are delivered.

3. In a solar heater, a preliminary water heating tank, comprising a shallow water receptacle topped by a metallic plate, a transparent plate above the water receptacle forming a dead air space, a series of reflectors hinged on the edges of the tank arranged to be adjusted to reflect the sun's rays and direct them against the metallic plate through the transparent plate and the dead air space therebeneath, means for delivering water to the receptacle, means for discharging the heated water therefrom, and means to which the heated water is delivered for converting it into steam.

In testimony whereof I have hereunto set my hand in the presence of two subscribing witnesses.

THOMAS F. NICHOLS.

Witnesses:
E. A. THORNTON,
F. G. DOLMAN.